(12) United States Patent
Murphy et al.

(10) Patent No.: US 8,203,719 B2
(45) Date of Patent: Jun. 19, 2012

(54) STITCHING OF NEAR-NULLED SUBAPERTURE MEASUREMENTS

(75) Inventors: Paul Murphy, Rochester, NY (US);
Gary Devries, Penfield, NY (US);
Christopher Brophy, Pittsford, NY (US); Greg Forbes, North Epping Sydney (AU)

(73) Assignee: QED Technologies International, Inc., Aurora, IL (US)

( * ) Notice: Subject to any disclaimer, the term of this patent is extended or adjusted under 35 U.S.C. 154(b) by 481 days.

(21) Appl. No.: 12/384,723

(22) Filed: Apr. 8, 2009

(65) Prior Publication Data

US 2009/0251702 A1    Oct. 8, 2009

Related U.S. Application Data

(60) Provisional application No. 61/123,333, filed on Apr. 8, 2008.

(51) Int. Cl.
*G01B 11/02* (2006.01)
(52) U.S. Cl. ....................................... 356/512
(58) Field of Classification Search .......... 356/450, 356/512
See application file for complete search history.

(56) References Cited

U.S. PATENT DOCUMENTS

| 4,686,360 A * | 8/1987 | Gorgon ............... 250/201.2 |
| 5,757,493 A | 5/1998 | VanKerkhove |
| 5,835,217 A | 11/1998 | Medecki |
| 6,392,752 B1 | 5/2002 | Johnson |
| 6,956,657 B2 * | 10/2005 | Golini et al. ............ 356/512 |
| 2006/0221350 A1 * | 10/2006 | Murphy et al. ............ 356/614 |

FOREIGN PATENT DOCUMENTS

WO    WO 2008-012091    1/2008

* cited by examiner

*Primary Examiner* — Tarifur Chowdhury
*Assistant Examiner* — Jonathon Cook
(74) *Attorney, Agent, or Firm* — Thomas Omholt; Thomas Ryan; Brian Shaw

(57) ABSTRACT

A metrology system for measuring aspheric test objects by subaperture stitching. A wavefront-measuring gauge having a limited capture range of wavefront shapes collects partially overlapping subaperture measurements over the test object. A variable optical aberrator reshapes the measurement wavefront with between a limited number of the measurements to maintain the measurement wavefront within the capture range of the wavefront-measuring gauge. Various error compensators are incorporated into a stitching operation to manage residual errors associated with the use of the variable optical aberrator.

30 Claims, 9 Drawing Sheets

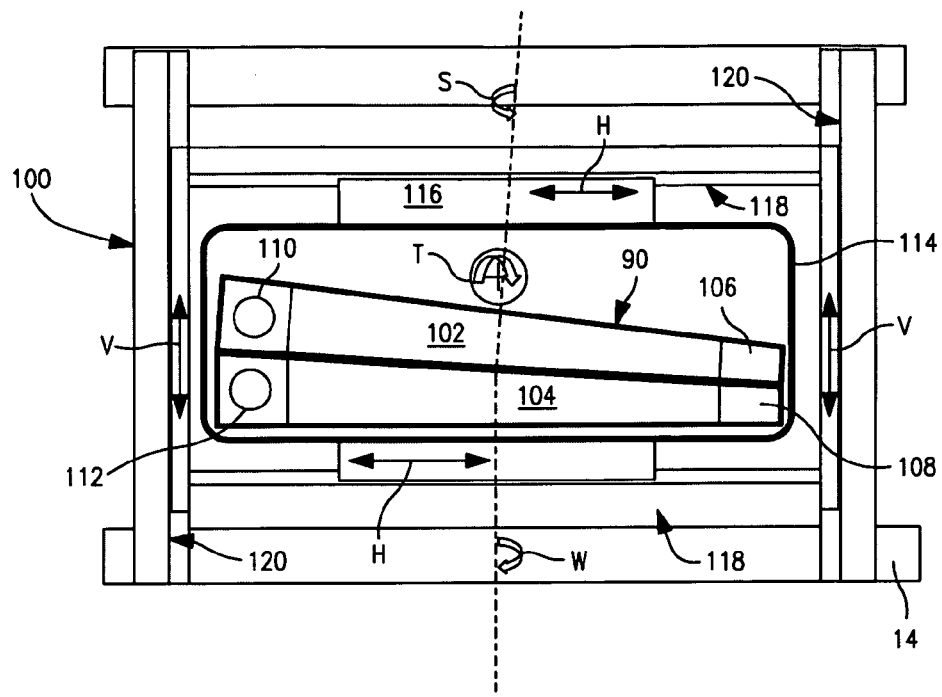
FIG. 9
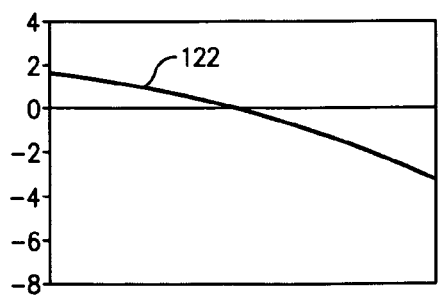
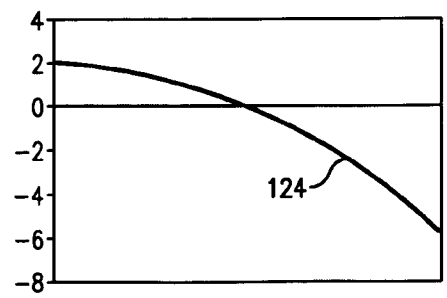
FIG. 10a  FIG. 10b

STITCHING OF NEAR-NULLED SUBAPERTURE MEASUREMENTS

CROSS REFERENCE TO RELATED APPLICATIONS

This application claims priority to provisional application No. 61/123,333 filed on Apr. 8, 2008.

US GOVERNMENT RIGHTS

This invention was made with U.S. Government support under NASA Contract Nos. NNG05CA71C and NNG06CA45C. The federal government has certain rights in the invention.

TECHNICAL FIELD

Wavefront measurements provide precise measurements of surface forms or transmission characteristics, particularly of high quality optics. The disclosure relates to systems and methods for subaperture wavefront measurements under near-null conditions for measuring aspheric forms.

BACKGROUND OF THE INVENTION

Many optical systems incorporate aspheric optical elements to improve performance or reduce the size or number of optical elements of the systems. Most such aspheric optical elements include surfaces having finite curvatures in orthogonal directions that vary from one another or vary as a function of position. Other aspheric optical elements include finite curvatures in just one direction but the curvatures vary as a function of position. As such, the surfaces of these aspheric optical elements depart from the conventional optical forms of spheres, cylinders, and planes. Yet other aspheric optical elements include refractive indices that similarly vary with position.

Subaperture stitching techniques based on wavefront measurements have been effectively used to measure many such aspheric optical elements or similar test objects. The subapertures collectively cover the entire area of the test object intended for measurement while partially overlapping each other to provide a comparable basis for assembling the subaperture measurements into a desired full aperture measurement.

Typically, each subaperture compares a limited local area of the test object to a sphere, such as by reflecting a spherical test wavefront from the local area of the test object and comparing the reflected wavefront against the original spherical wavefront. Any departure of the local area of the test object from the referenced spherical form is incorporated into the shape of the reflected test wavefront. Various techniques are available for comparing the shape of the test wavefront against the original reference wavefront, such as by forming interference patterns, but the range of measurement over which such comparisons are effective is limited. For example, the fringe densities of interference patterns can increase beyond resolvable limits. As a result, the size of the subapertures is limited so that the local areas remain comparable to a sphere, and the number of subapertures is increased to cover the desired area of the test surface. Test objects having a form that locally departs more significantly from a spherical form can require a much larger number of subaperture measurements, which can increase measurement time, calculation complexity, noise, and other sources of error.

Certain on-axis wavefront measurements for measuring rotationally symmetric test objects stitch together a plurality of subapertures having the form of concentric annular zones. Focal distance or other adjustments are made to vary the local curvatures of the test wavefronts to match the expected curvatures of the different annular zones. In addition to incrementally varying the curvatures of reference spheres with distance along the axis of the test objects to match the nominal curvatures of different annular zones, fourth and higher order rotationally symmetric changes to the test wavefront have been proposed to match curvature variations within larger annular zones of test objects.

Although the higher order rotationally symmetric changes to the test wavefront reduce the number of measurements required to cover the desired area of a test object, the optics required for conducting these on-axis measurements must still be sized, like other on-axis measurements, in relation to the largest annular zone of the measurement. The cost of the measurement optics generally increases with size and numerical aperture, and large measurement optics can be difficult to manufacture to required accuracy. In addition, any relative change to the shape of the test wavefront beyond that imparted by the test object must be precisely known to compare the test object to the original reference wavefront. While it has been proposed to precisely measure the wavefront modifying optics along with relative motions among the optics required for imparting changes to the test wavefront, applicants have found that differences between the actual and predicted performance of the wavefront modifying optics can introduce systematic errors into the test wavefront. That is, an over-reliance on the calibration of the wavefront modifying optics can produce specious measurement results, where errors in the departure of the wavefront modifying optics from their expected form are indistinguishable from errors in the departure of the test object from its expected form.

Full aperture measurements of aspheric test objects have also been proposed using matching aspheric wavefronts. However, similar problems are apparent regarding the required size of the measuring optics and the difficulty of precisely reproducing the desired aspheric wavefronts, especially if the aspheric wavefronts must be adaptable to measuring different aspheric test objects. Such wavefront modifying optics, which can take the form of spatial light modulators, deformable mirrors, or adjustable lens assemblies, tend to be more complicated than the aspheric test objects intended for measurement, and accurate monitoring of certain dimensions of the wavefront modifying optics is no guarantee that the actual performance of the wavefront modifying optics is free of systematic errors, particularly high-order errors rendered as specious artifacts of the test object.

SUMMARY OF THE INVENTION

The invention, among some of its preferred embodiments, features systems and methods for the subaperture measurement of aspheric optics or other test objects. The subaperture measurements can be collected by optics sized independently of the overall size of the test objects and can be based on alternative wavefront forms for increasing the size of the subapertures while compensating for attendant systematic errors. Similarly sized subaperture measurements can be collected from different angular positions about individual test objects. A variable optical aberrator relatively modifies the measurement wavefront shape to nearly match the intended form of the test object within the different subapertures.

While the variable optical aberrator is preferably modeled and measured in situ for estimating the effects of individual adjustments on the shape of the measurement wavefront, the estimated effects of the variable optical aberrator on the shape of the measurement wavefront are used mainly for purposes of near nulling, e.g., approximately matching the intended aspheric characteristics of the test object, and any remaining differences between the estimated effects of the variable optical aberrator and the actual effects of the variable optical aberrator are resolved within the stitching operation. For example, compensators relating to variables within the model of the variable optical aberrator and representative of measures of systematic errors within the subaperture measurements can be resolved from the overlapping measurements of the test object. While the variable optical aberrator allows for a reduction in the number of subaperture measurements required to measure a test object, the size of the subapertures is preferably limited so that enough regions of overlap between subaperture measurements are available for resolving systematic errors attributable to the variable optical aberrator and any other identified sources within the metrology system. High accuracy wavefront measurements can be made over a wide range of aspheric test objects while reducing uncertainties associated with aspheric wavefront shaping.

For resolving the systematic errors associated with the use of a variable optical aberrator, the variable optical aberrator preferably remains at the same setting for a plurality of subaperture measurements. Thus, a set of systematic errors can be associated with each subset of the subaperture measurements at a given setting of the variable optical aberrator. A special class of stitching compensators can be defined for characterizing such systematic errors for reducing the influence of the errors on the measurement of the test object. Ordinarily, the compensators are of a type that are free to assume different values for each subaperture measurement, referred to as free compensators, or the compensators are of a type that are constrained to assume a single value for all of the subaperture measurements, referred to as interlocked compensators. The special compensators, which can be associated with some of the individual settings of the variable optical aberrator, are constrained assume substantially the same value within each subset of subapertures associated with a given setting of the variable optical aberrator but are free to assume different values between different subsets of subapertures associated with different settings of the variable optical aberrator, and such compensators are hereafter referred to as partially interlocked compensators. Other systematic errors of the variable optical aberrator can be represented by interlocked or free compensators. Similarly, other systematic errors in the overall metrology system can represented by various combinations of free compensators, partially interlocked compensators, and interlocked compensators.

One method of practicing the invention involves beneficially expanding the operating range of metrology system for measuring aspheric test objects. A wavefront propagator is associated with a physical test object in a plurality of different relationships. Partially overlapping wavefront measurements of the test object are acquired in each of the different relationships by measuring a shape of a measurement wavefront with a wavefront-measuring gauge having a limited capture range of wavefront shapes. A variable optical aberrator reshapes the measurement wavefront between a limited number of the measurements in the different relationships to maintain the measurement wavefront within the capture range of the wavefront-measuring gauge. An operation for assembling the partially overlapping measurements into a composite measurement incorporates compensators that acquire values in the operation for reducing differences between overlapping portions of the measurements that are at least partially attributable to the reshaping of the measurement wavefront by the variable optical aberrator.

Preferably, the variable optical aberrator is adjustable through a range of settings for reshaping the measurement wavefront. The compensators can have both an amplitude and a functional form that defines a change in the shape of the measurement wavefront that is scalable by the amplitude. Among the compensators are partially interlocked compensators that are preferably constrained to acquire a substantially common amplitude over a set of the measurements taken at the same setting of variable optical aberrator. However, the partially interlocked compensators are preferably free to acquire a different substantially common amplitude over a different set of the measurements taken at a different setting of the variable optical aberrator.

The partially interlocked compensators can account at least in part for differences between an estimated change in the shape of the measurement wavefront produced at a particular setting of the variable optical aberrator and an actual change in the shape of the measurement wavefront produced at the particular setting of the variable optical aberrator. The estimated change in the shape of the measurement wavefront produced at each setting of the variable optical aberrator can be based on a model of the variable optical aberrator. As such, the functional form of at least one of the partially interlocked compensators preferably relates a variable within the model of the variable optical aberrator to a change in the shape of the measurement wavefront that is scalable by the amplitude. The variable optical aberrator can be reconfigurable between settings, and the at least one partially interlocked compensator can be associated with the reconfiguration of the variable optical aberrator.

The wavefront-measuring gauge can be an interferometer, and, as such, the measurement wavefront can include both a test wavefront and a reference wavefront. The test wavefront propagates into an encounter with the test object and the resulting shape of the test wavefront is compared to the reference wavefront. In situations where the resulting shape of the test wavefront increases fringe density beyond adequately resolvable limits, the variable optical aberrator changes the shape of at least one of the test wavefront and the reference wavefront to systematically reduce differences between the test and reference wavefronts.

Alternatively, the wavefront-measuring gauge can be a wavefront sensor for measuring a limited range of wavefront shapes. A wavefront generator generates the measurement wavefront in a shape that is within the limited range of wavefront shapes measurable by the wavefront sensor. The measurement wavefront propagates into an encounter with the test object for changing the shape of the measurement wavefront in accordance with a physical characteristic of the test object. The variable optical aberrator changes the shape of the measurement wavefront so that a combined effect of the changes in shape of the measurement wavefront effected by the encounter with the test object and the reshaping of the measurement wavefront by the variable optical aberrator maintains the shape of the measurement wavefront within the limited range of wavefront shapes measurable by the wavefront sensor.

Another method of practicing the invention involves assembling a composite measurement of a physical test object from a plurality of partially overlapping measurements of the test object. A plurality of partially overlapping data maps measuring a physical property of the test object are acquired from a test wavefront that encounters the test object. Each data map is extracted from a shape of the test wavefront referenced against a datum. The shape of the test wavefront is relatively changed with respect to the datum independently of the test object between acquisitions of a limited number of the data maps to reduce differences between the shape of the test wavefront and the datum. Overlapping regions of the data maps are evaluated to characterize the relative change in the wavefront shape between acquisitions of the data maps. The data maps in are modified in accordance with the characterization of the relative change in the wavefront shape between measurements for assembling the partially overlapping data maps into a composite data map. The composite data map can be displayed or otherwise output as an external representation of the test object.

Preferably, the changes in the shape of the test wavefront effected by the encounters of the test wavefront with the test object are estimated, and at least part of the estimated changes in the shape of the test wavefront are counteracted to reduce the differences between the shape of the test wavefront and the datum. In addition, the change in the relative shape of the test wavefront with respect to the datum is also estimated, and the estimated change in the relative shape of the test wavefront with respect to the datum is distinguished from an actual change in the relative shape of the test wavefront with respect to the datum for characterizing a systematic error in the data maps. The partially overlapping data maps are assembled into the composite data map while suppressing influence of the systematic error in the data maps associated with the relative change in the shape of the test wavefront with respect to the datum.

Compensators are preferably defined to account at least in part for differences between the estimated change in the relative shape of the test wavefront with respect to the datum and the actual change in the relative shape of the test wavefront with respect to the datum. The compensators can include partially interlocked compensators that are constrained to acquire a substantially common value over a set of the data maps acquired while maintaining the shape of the test wavefront with respect to the datum.

A related method of practicing the invention involves assembling a composite measurement of a physical test object from a plurality of subaperture measurements of the test object. A measurement wavefront is generated, and the measurement wavefront propagates through encounters with both a variable optical aberrator and the physical test object en route to a wavefront-measuring gauge having a limited capture range of wavefront shapes. An axis of a wavefront propagator is stepped relative to an axis of the physical test object through a succession of off-axis positions between the wavefront propagator and the test object. The wavefront propagator is arranged for conveying the measurement wavefront to the test object. The variable optical aberrator is adjusted between a limited number of the off-axis positions for maintaining the shape of the measurement wavefront within the capture range of the wavefront-measuring gauge. Partially overlapping subaperture measurements of the test object are collected with the wavefront-measuring gauge at the succession of off-axis positions. Mismatched measurements within overlapping portions of subaperture measurements are evaluated to characterize effects of the variable optical aberrator on the subaperture measurements. The subaperture measurements of the test object are stitched together into a composite measurement while discounting the characterized effects of the variable optical aberrator on the subaperture measurements.

The effects of the variable optical aberrator on the subaperture measurements can be modeled, and the values of variables within the model can be changed to reduce the mismatched measurements within overlapping portions of subaperture measurements. The axis of the wavefront propagator can be stepped about the axis of the test object for collecting a set of radial subaperture measurements of the test object while the variable optical aberrator is maintained at a fixed setting. At least some of the variables within the model can be constrained to include substantially common values for each of the common radial subaperture measurements.

Yet another related method for practicing the invention involves synthesizing a composite data map of a test surface of a physical object from a plurality of overlapping subaperture data maps of the test surface. The plurality of subaperture numerical data maps of the test surface are collected from a plurality of regions of the test surface with a metrology system. At least a portion of each such map overlaps a portion of at least one adjacent map to create a region of overlapping data. Partially interlocked compensators are associated with certain systematic errors in the data maps, which such errors are expected to be common within groups of the subaperture data maps but differ between the groups of the subaperture data maps. Each of the partially interlocked compensators has an amplitude and a functional form that defines a change in the subaperture data maps that is scalable by the amplitude. The partially interlocked compensators are constrained to acquire a substantially common amplitude within each group of the subaperture data maps while being free to acquire different amplitudes between the groups of subaperture data maps. The amplitudes of the partially interlocked compensators that minimize mismatch data from each of said data maps in said overlapping regions are identified for isolating the systematic errors in the data maps. The data maps are synthesized into a composite data map as a representation of the test surface while suppressing influence of the isolated systematic errors.

In addition to the partially interlocked compensators, the practice of the method can also include (a) associating free compensators with systematic errors in the data maps that are expected to differ among all of the subaperture data maps, the free compensators having a free amplitude range and (b) associating interlocked compensators with systematic errors in the data maps that are expected to be common among all of the subaperture data maps, the locked compensators being constrained to acquire a substantially common amplitude for all of the subaperture data maps. Each of the free and interlocked compensators also has an amplitude and a functional form that defines a change in the subaperture data maps that is scalable by the amplitude. The amplitudes of the free and interlocked compensators that minimize mismatch data from each of said data maps in said overlapping regions can be identified for isolating additional systematic errors in the data maps.

The invention can also be expressed as a wavefront-measuring system for measuring test objects. A support includes a mounting axis for mounting a test object. A wavefront propagator conveys a measurement wavefront to and from the test object along a measuring axis. A wavefront-measuring gauge measures a shape of the measurement wavefront against a datum. Adjustable machine axes provide off-axis motion between the mounting axis of the support and the measuring axis of the wavefront propagator to capture a plurality of subaperture measurements covering partially overlapping areas of the test object. A variable optical aberrator relatively changes a shape of the measurement wavefront with respect to the datum. Data structures embodied in a computer-readable medium include compensators each having a variable amplitude and a functional form that defines a change in the shape of the measurement wavefront that is scalable by the amplitude. A processor calculates the amplitudes of the compensators in an operation for assembling the subaperture measurements into a composite measurement by determining the amplitudes of the compensators that minimize differences between overlapping portions of the subaperture measurements including differences that are attributable to the relative changes in the shape of the measurement wavefront by the variable optical aberrator.

The data structures can include a model of the variable optical aberrator that is accessible to the processor for estimating relative changes in the measurement wavefront shape effected by the variable optical aberrator. The compensators preferably account at least in part for differences between an estimated change in the measurement wavefront shape effected by the variable optical aberrator and an actual change in the measurement wavefront shape effected by the variable optical aberrator.

The variable optical aberrator preferably includes reconfigurable optics that are reconfigurable for incorporating at least one of astigmatism, coma, and trefoil into the shape of the measurement wavefront. For example, the variable optical aberrator can include at least two relatively movable optics that are angularly adjustable with respect to each other. More specifically, the variable optical aberrator can be an adjustable prismatic device having at least two relatively adjustable prisms.

BRIEF DESCRIPTION OF THE DRAWING FIGURES

Figure 6A:
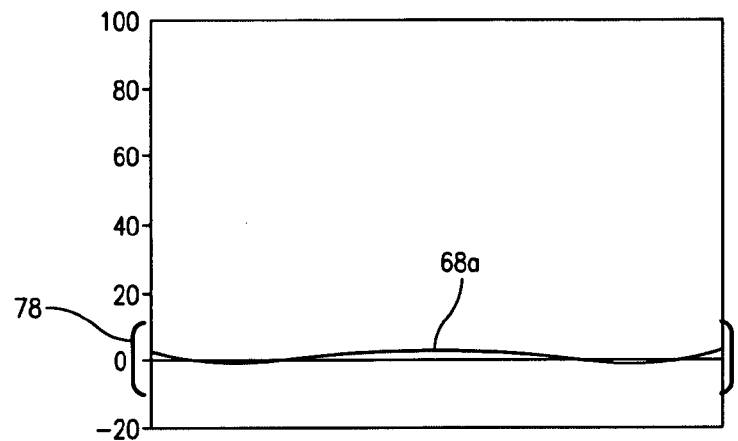
Figure 6B:
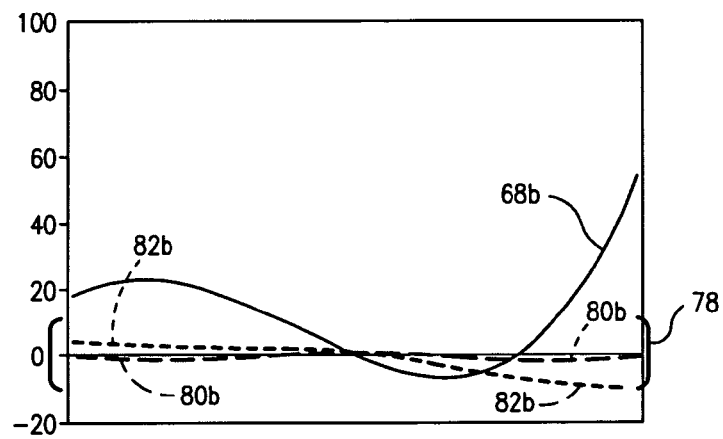
Figure 6C:
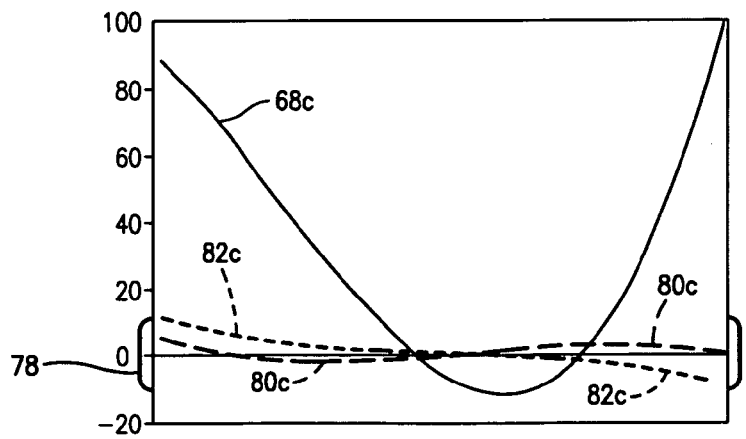

FIGS. 6a, 6b, and 6c include graphs plotting various measurement wavefronts, including wavefronts illustrating effects of the variable optical aberrator.

Figure 7:
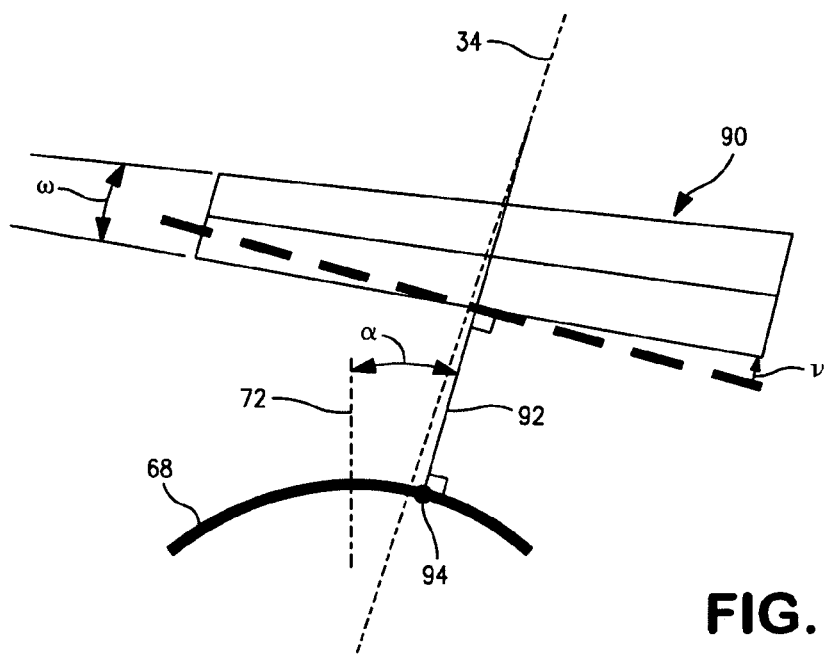
Figure 8:
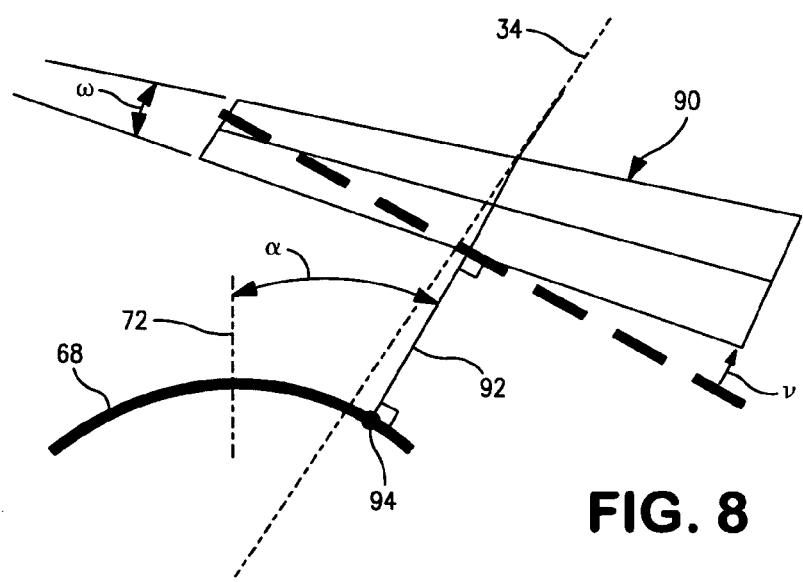

FIGS. 7 and 8 are diagrams depicting use a variable optical aberrator at different settings for collecting subaperture measurements at different aperture angles.

FIG. 9 is a more detailed representation of one example of the variable optical aberrator illustrating various settings of the aberrator.

FIGS. 10a and 10b include graphs plotting the expected effect of a compensator-referenced systematic error at two different settings of the variable optical aberrator.

Figure 3:
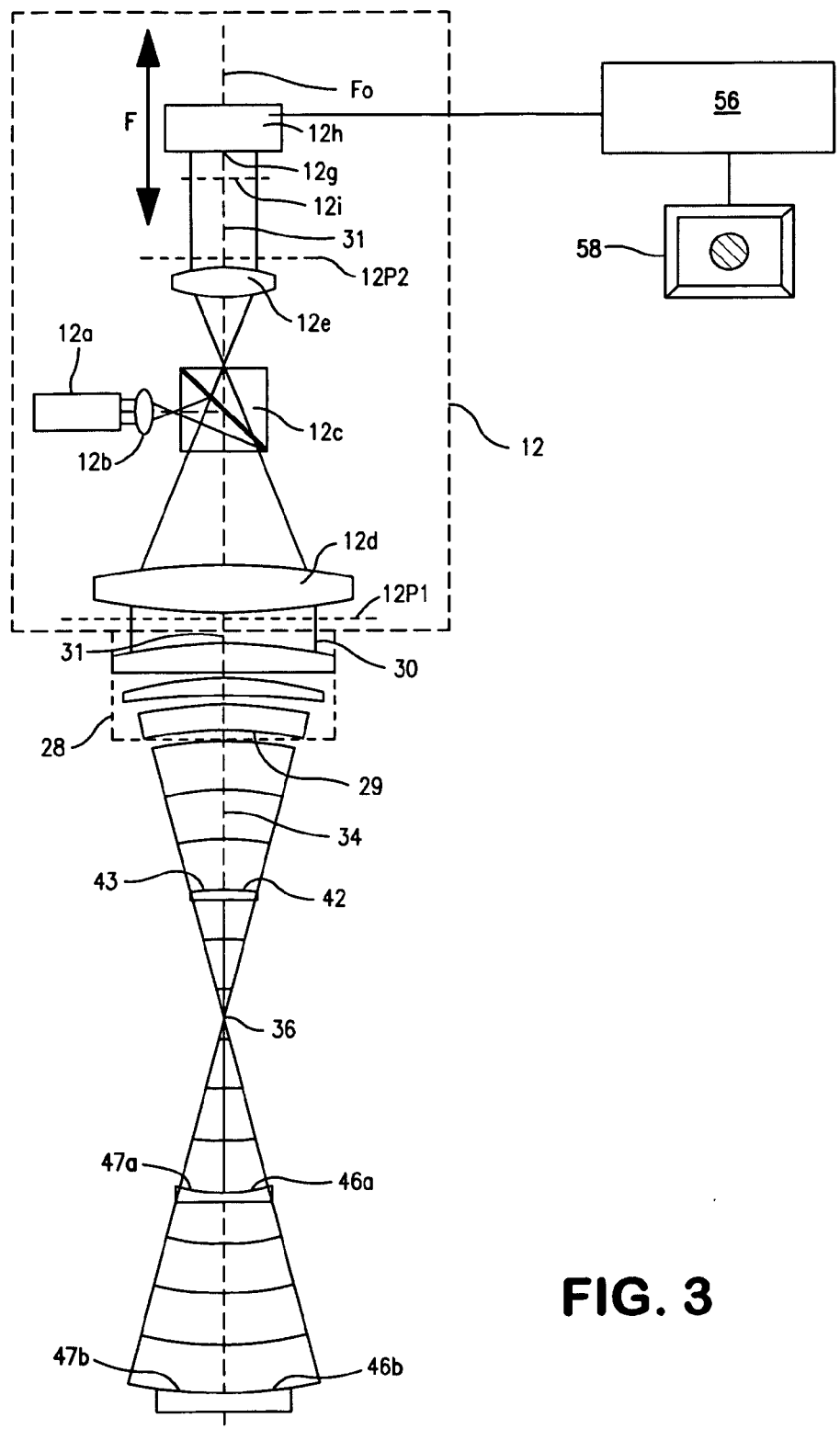
FIG. 3 is a sample internal diagram of a wavefront-measuring gauge showing an output beam along which three different test optics are arranged for measurement.
Figures 11A, 11B:
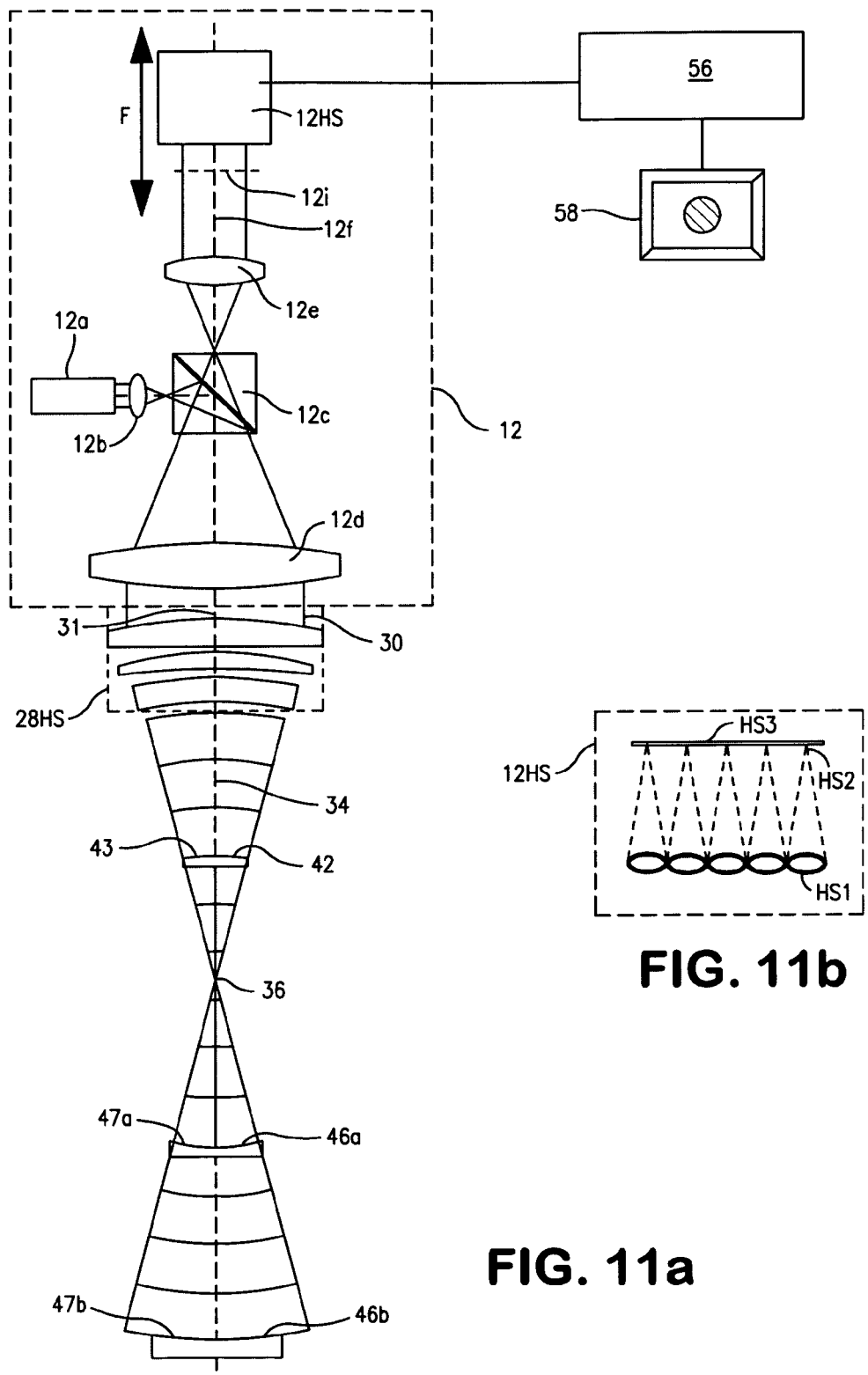

FIGS. 11a and 11b are diagrams of an alternative wavefront-measuring gauge with FIG. 11a similar to the diagram of FIG. 3 but replacing a Fizeau interferometer arrangement with a corresponding arrangement for a Shack-Hartman wavefront sensor, the sensor itself diagramed in the enlarged view of FIG. 11b.

DETAILED DESCRIPTION OF THE INVENTION

Preferred embodiments of the invention are directed metrology systems and their methods of use, particularly such systems that synthesize or otherwise assemble subaperture measurements into a composite measurement and to improvements in such systems and methods for measuring aspheric test objects. Significantly, the embodiments provide for increasing the effective range of the subaperture measurements, having the potential for savings in cost and time as well as improvements in measurement accuracy.

Figure 1:
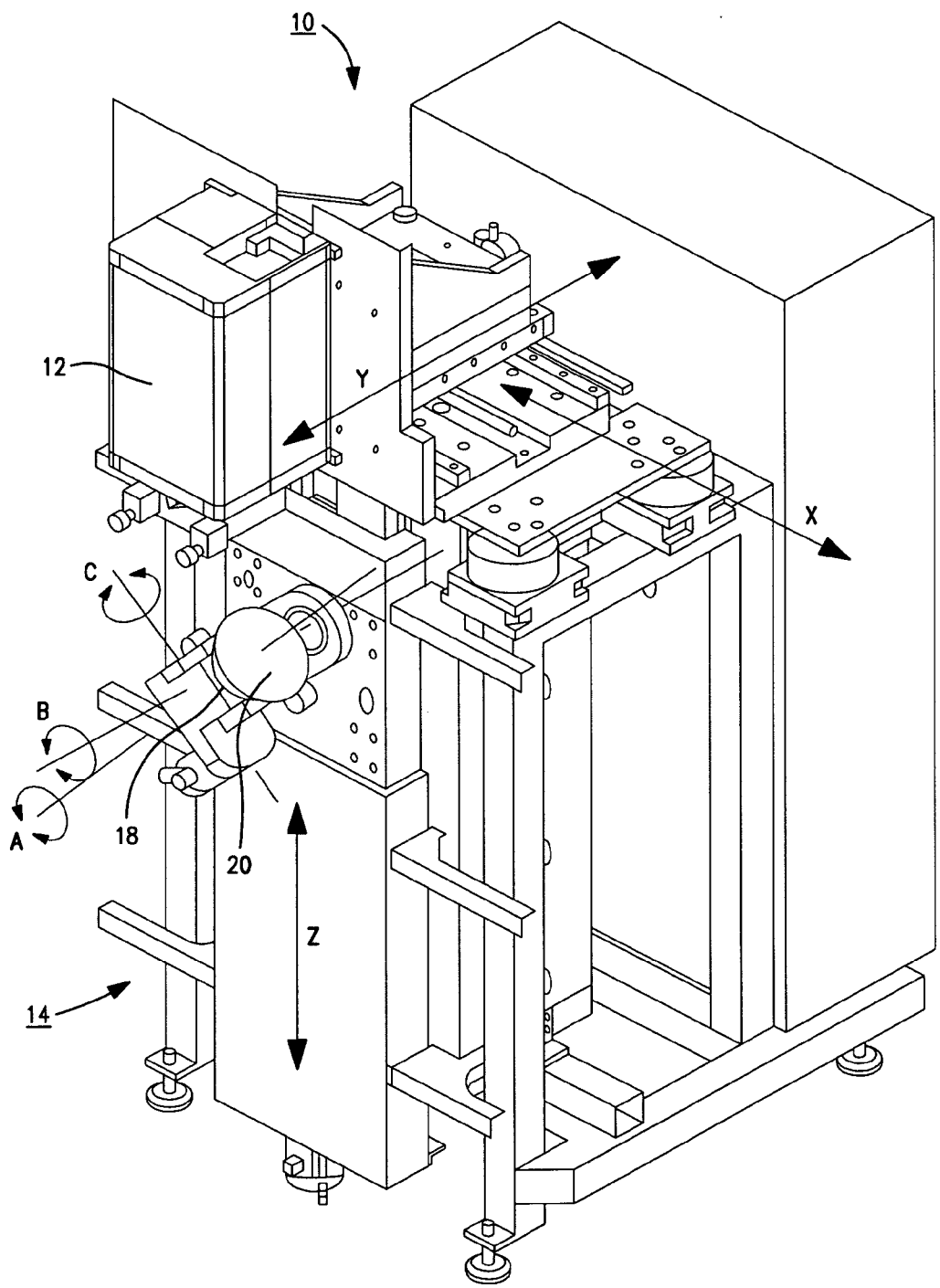
FIG. 1 is an isometric view of a multi-axis metrology system in accordance with the invention.
Figure 2A:
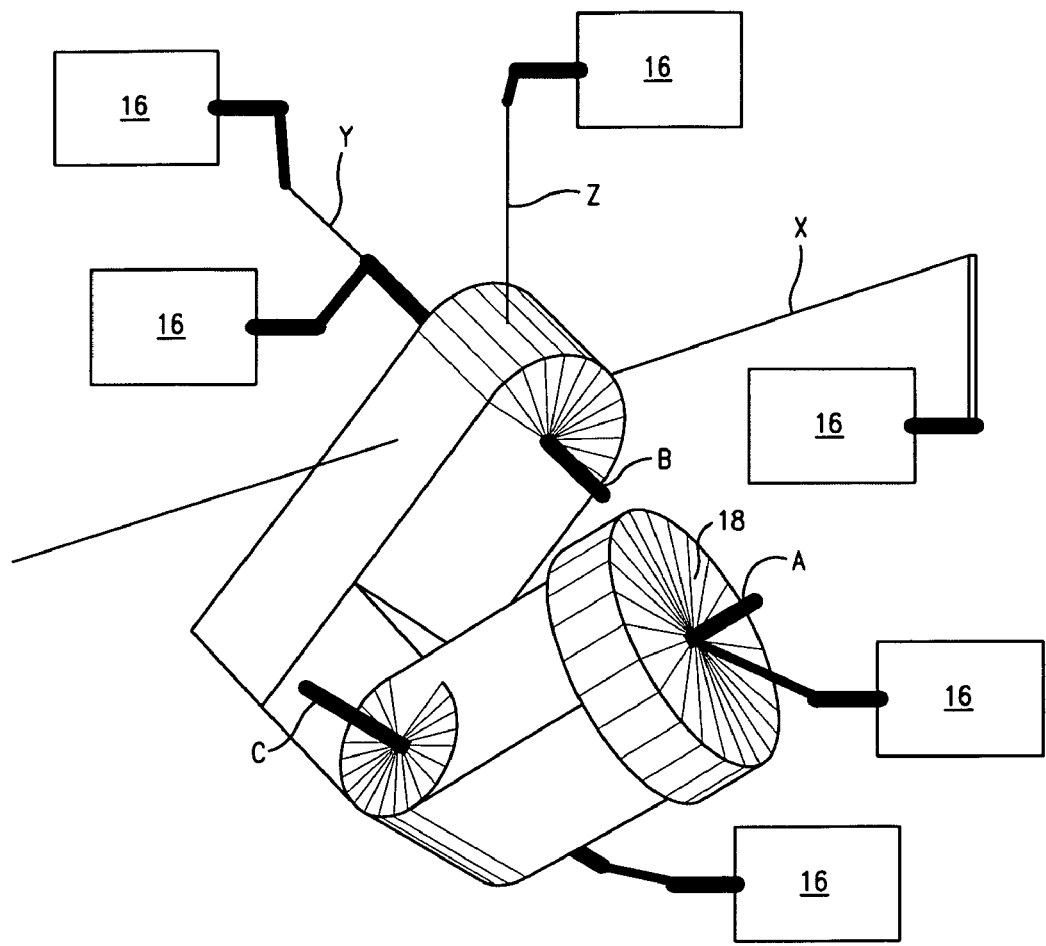
FIG. 2a is a schematic isometric depiction of the six axes embodied in the instrument shown in FIG. 1.
Figure 2B:
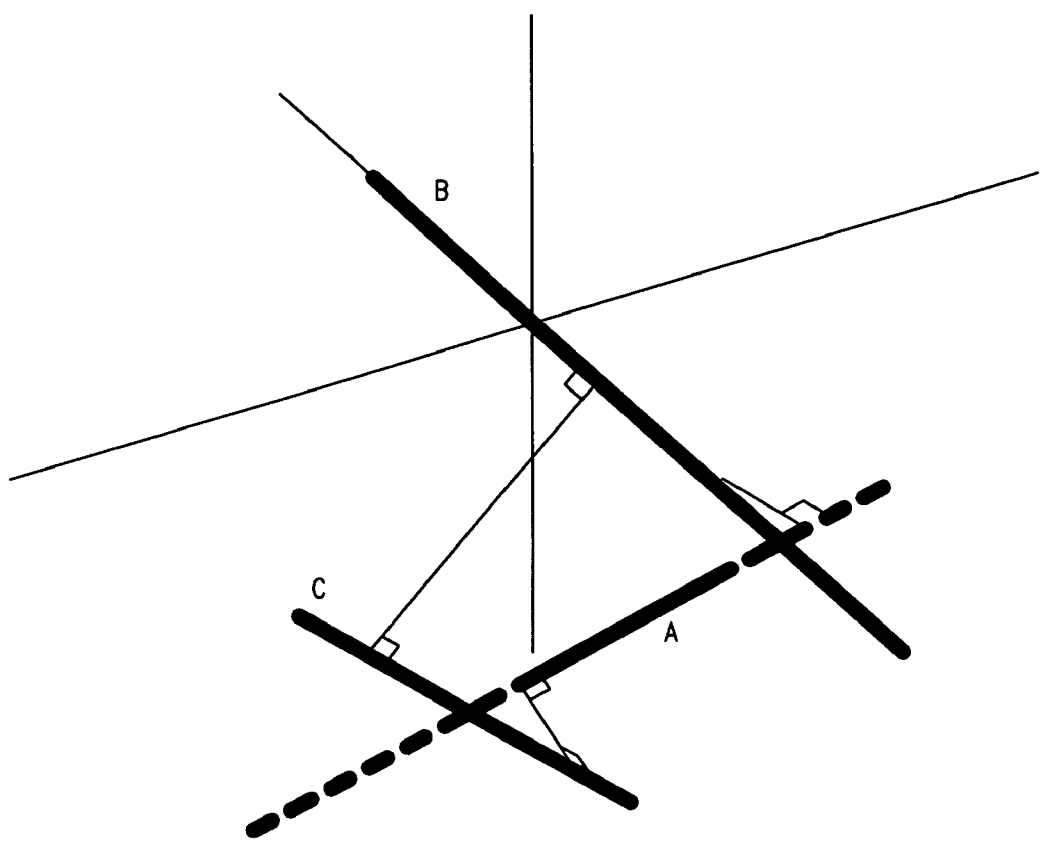
FIG. 2b is a schematic isometric depiction of the offsets between the rotational axes of the instrument shown in FIG. 1.

One example of such a metrology system is shown in FIG. 1. The depicted metrology system 10 includes a wavefront-measuring gauge 12, for example, an interferometer, mounted to ("embedded" in) a multi-axis machine 14 defining a workstation having a chuck or stage 18 for receiving and moving a test object 20 during measurement thereof. The multi-axis machine 14 provides six axes of motion between the wavefront-measuring gauge 12 and the chuck or stage 18 supporting the test object 20. The six axes of motion as shown in FIGS. 2a and 2b include three mechanical axis for providing translation (X, Y, Z) and three mechanical axes for providing rotation (A, B, C).

For purposes of discussion, the X, Y, and Z translational axes are considered mutually orthogonal, the B rotational axis is considered parallel to Y translational axis, the B and C rotational axes are considered orthogonal, and that the A and C rotational axes are also considered orthogonal. In a high-quality machine platform, such as employed in a CNC machine, these assumptions are generally valid within a range of error necessary for micron-range surface topology. As convention as used herein, when rotational axes B and C are set to zero, the A rotational axis points along the Z translational axis. The Z translational axis is not parallel to the A rotational axis at any other positions of the B and C rotational axes (except, of course, a 180° rotation).

Motion along or about these six mechanical axes is preferably independently controlled by respective actuators 16 such as stepper motor assemblies having conventional mountings and drive couplings (e.g., gearing). The individual mechanical axes can be under either automatic or manual control. The type of control is not an essential part of the process. Different numbers mechanical axes can be used along with different orientations and offsets between the mechanical axes as may be appropriate for relatively moving the wavefront-measuring gauge with respect to the chuck or stage 18 through a range of desired relative positions. Any misalignments of the machine axes can be accommodated during either the calibration of the metrology system 10 or subsequent stitching operations as disclosed in co-assigned U.S. Pat. No. 7,173,691 entitled "Method for Calibrating the Geometry of a Multi-Axis Metrology System," which patent is hereby incorporated by reference.

The wavefront-measuring gauge 12 can take a variety of forms beyond an interferometer, including as a Shack-Hartmann wavefront sensor. However, as shown in FIG. 3, the wavefront-measuring gauge is depicted as a Fizeau interferometer. The light source 12a emits a beam of coherent light that is focused by lens 12b through a focal point for forming an expanding beam of light. A beamsplitter 12c receives the expanding beam of light and reflects a portion of the light beam along an internal optical axis 31 of the gauge 12. A collimating lens 12d collimates the light beam in advance of a transmission sphere 28, which further shapes the collimated light beam 30 and divides the shaped light beam into test and reference beams. A reference surface 29, which forms the last surface of the transmission sphere 28, has a spherical surface form that matches the wavefront shape of the further shaped light beam incident upon the reference surface 29. A transmission flat, a transmission cylinder, or other transmission shapes could be substituted for the transmission sphere 28 for providing other reference surface shapes.

A portion of the incident light beam is retroreflected by the reference surface 29 in the form of a reference wavefront and a remainder of the light beam is transmitted through the reference surface 29 in the form of a test wavefront. Preferably, the internal optical axis 31 of the gauge 12 extends parallel to both an external optical axis 34 of the gauge 12 and the Z-axis travel direction. In the depicted spherical form, the test wavefront propagates along the external measurement axis 34, converging through a focal point 36 for converting between a concave and convex form. Alternative test objects 42, 46a, and 46b having complementary convex and concave surface forms are shown in different positions along the measurement axis 34.

The test wavefront reflects from any one of the encountered test surfaces 43, 47a, or 47b, reentering the gauge 12 through the transmission sphere 28 and propagating together with the reflected reference wavefront through collimating lens 12d to the beamsplitter 12c. A portion of the returning light transmits through beamsplitter 12c and through a lens 12e for focusing an image of the encountered test surface onto a detector 12g. The lens 12e is preferably chosen to collimate the light (making the system telecentric in image space). A plane 12i is nominally conjugate to the encountered test surface 43, 47a, or 47b after passing through all the optics. A focusing axis F provides for moving the detector 12g along the optical axis 31 to a position coincident with the conjugate plane 12i, thereby achieving the optimal focus for the particular test surface 43, 47a, or 47b. Preferably, the detector 12g includes CCD (charge coupled device) sensor arrays (which can include other video electronics in package 12h) but could also include diffuser disks (which would include additional relay imaging optics in package 12h).

Generally, the optics of wavefront-measuring gauges image wavefronts onto a plane of detection (where the intensity and/or phase of the wavefront is recorded). Such gauges usually require placing the surface (or optical system) under test at a specific distance from the gauge as shown in FIG. 3. The optimal distance depends on both the gauge's optics as well as the test surface's radius of curvature and generally corresponds to a confocal arrangement that locates a nominal center of curvature of the test surface coincident with the gauge focal point 36. Therefore, different test surfaces with different radii, such as the surfaces 43, 47a, and 47b, are placed at different distances from the gauge (and have different object conjugates). The optimal location of the gauge detection plane (12g coincident with image conjugate 12i) changes as a result, usually in accordance with $$\frac{1}{obj} + \frac{1}{img} = \frac{1}{f} \quad (1)$$

where "obj" is the displacement from the test surface to the gauge's first principal plane 12P1, "img" is the displacement from the gauge's rear principal plane 12P2 to the image plane (i.e. optimal location of the detection plane), and "f" is the focal length of the gauge's optical system.

The gauge operator can manually (and visually) adjust the detection plane 12g (and thus "img") to achieve the sharpest image for a given test configuration (12g coincident with test surface image conjugate 12i). This typically requires a physical edge or some other high-contrast feature (e.g. the part edge, or a piece of paper inserted into the gauge wavefront to temporarily provide an edge to focus on) for the operator to discern when the best focus has been achieved. However, automatic focusing can also be employed as disclosed in co-assigned U.S. Pat. No. 7,433,057 entitled "Method for Accurate High-Resolution Measurements of Aspheric Surfaces," which patent is hereby incorporated by reference.

Achieving the optimal focal position of the wavefront-measuring gauge 12 with respect to the test surface 43, 47a, or 47b intended for measurement can be important for two reasons. First, optimal focusing is important for mapping individual measuring points to their corresponding points on the test surface 43, 47a, or 47b. Second, optimal focusing is important for matching the curvature of the test wavefront to the expected curvature of the test surface 43, 47a, or 47b (a so-called "null" condition) so that the returning test wavefront exactly matches the reference wavefront when the test surface 43, 47a, or 47b matches the reference surface 29.

However, for measuring aspheric test surfaces that depart from a spherical shape, a near null condition is generally the best that can be achieved using a spherical reference surface. That is, even if the aspheric test surface is made exactly to specification, some departure between the returning test and reference wavefronts (i.e., departure from the null condition) is required to account for the intended departure of the aspheric surface from the spherical reference surface. Interferometers and other wavefront-measuring gauges generally have a limited capture range through which test wavefronts that depart from a reference surface or other datum can be measured. In interferometers, the fringe density within the resulting interference pattern can increase beyond resolvable limits. Thus, the departure of aspheric surfaces from the referenced form exhausts at least part of the measuring range of the wavefront-measuring gauge 12.

Figure 4:
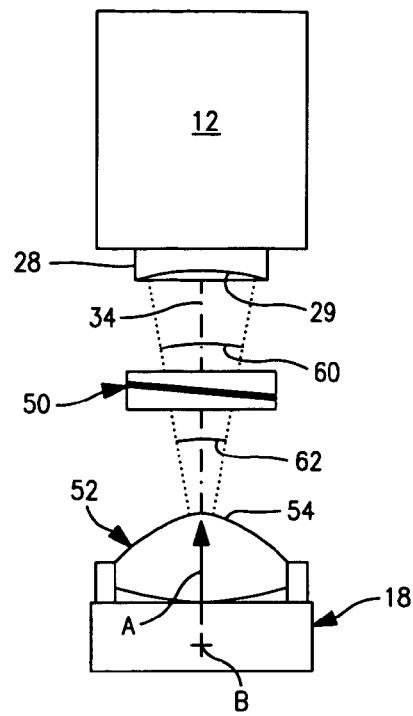
FIG. 4 is a diagram of a part of the multi-axis metrology system with a variable optical aberrator added between the wavefront-measuring gauge and a support for mounting an aspheric test object.

As shown in FIG. 4, an embodiment of the invention interposes a variable optical aberrator 50 between the transmission sphere 28 of the wavefront-measuring gauge 12 and the chuck or stage 18 of the multi-axis machine 14. The chuck or stage 18 functions as a support for mounting and positioning an aspheric test object 52. An aspheric test surface 54 of the aspheric test preferably has an axis of rotational symmetry oriented coincident with the rotational axis A of the multi-axis machine 14.

The variable optical aberrator 50 reshapes a measurement wavefront 60 (e.g., the test wavefront of a Fizeau interferometer) propagating along the external axis 34 of the wavefront-measuring gauge 12, where necessary, into a reshaped measurement wavefront 62 for more closely matching the anticipated local shape of the aspheric test surface 54. The amount of reshaping performed by the variable optical aberrator 50 can be matched to a difference between (a) an estimated shape of the aspheric test surface 54 over the area of the measurement taken, for example, from design specifications of the aspheric test surface 54 and (b) the reference surface shape or other datum against which the aspheric test surface 54 is compared. Alternatively, such as when information about the expected shape of the aspheric test surface 54 is not available, the variable optical aberrator 50 can iteratively cycled through a sequence of adjustments to the measurement wavefront 60 tested against a measure of the measurement quality, such as apparent fringe spacing, until a near-null condition is reached. Either way, the variable optical aberrator 50 restores the metrology system 10 to at least a near null condition within the capture range of the wavefront-measuring gauge 12.

Image data collected by the wavefront-measuring gauge 12 as subaperture wavefront measurements is transformed within a computer processor 56 into subaperture data maps, which can numerically represent physical features of the test object 52, such as surface topography. Data is also preferably collected within the computer processor 56 for monitoring settings of the variable optical aberrator 50. In addition, information describing both the variable optical aberrator 50 and the test object 52 is preferably stored in a data structure (e.g., a computer readable medium) accessible to the computer processor 56 for estimating the effect of both the variable optical aberrator 50 and the test object 52 on the measurement wavefront. Information concerning the test object 52 can be used to predict local differences between the test surface 54 of the test object 52 and a reference datum, such as the reference surface 29 to determine the amount of measurement wavefront reshaping required to achieve a near null condition. Information concerning the variable optical aberrator 50 can be used to adjust the optical aberrator to settings required to reshape the measurement wavefront as required to achieve a near null condition. In addition, estimates concerning the effects of the variable optical aberrator 50 on the measurement wavefront can be incorporated into the processing of the subaperture data maps for distinguishing the wavefront effects attributable to the test object 52 from the wavefront effects attributable to the variable optical aberrator 50. The computer processor 56 also provides for the assembly of the subaperture data maps into a composite map further accounting for residual wavefront effects of the variable optical aberrator 50, as will be described more fully below. An output device 58, such as a display or other communication or data presentation device, can be used to present the composite map as a physical representation of the test object 52 for practical use, such as in the inspection, qualification, or further manufacture of the test object 52.

While the possibility of measurement wavefront reshaping can obviate the need for subaperture stitching by matching the measurement wavefront over the entire test surface, subaperture stitching provides additional advantages. Near-nulling within limited aperture sizes reduces the range of wavefront reshaping required for measuring aspheric test objects. Simpler, more easily controlled, and more predictable variable optical aberrators can be used. Conversely, a given range of wavefront adjustment by a variable optical aberrator can allow for the measurement of a greater range of aspheric test surfaces. Although the measurement area covered by a stitched composite measurement is not necessarily larger than the measurement area covered by the individual subaperture measurements that are assembled into the composite measurement, the composite measurements certainly can cover larger areas of measurement and generally do. Thus, the possibility of subaperture stitching limits the size of the optics required for measuring test surfaces including the size of the variable optical aberrator. Perhaps even more importantly, measurement processing associated with subaperture stitching, as will be explained, can be used to identify residual systematic errors associated with the variable optical aberrator despite the most careful modeling and measurement of the variable optical aberrator. Thus, subaperture stitching in combination with the variable optical aberrator allows for more accurate measurement of aspheric test objects.

Figure 5:
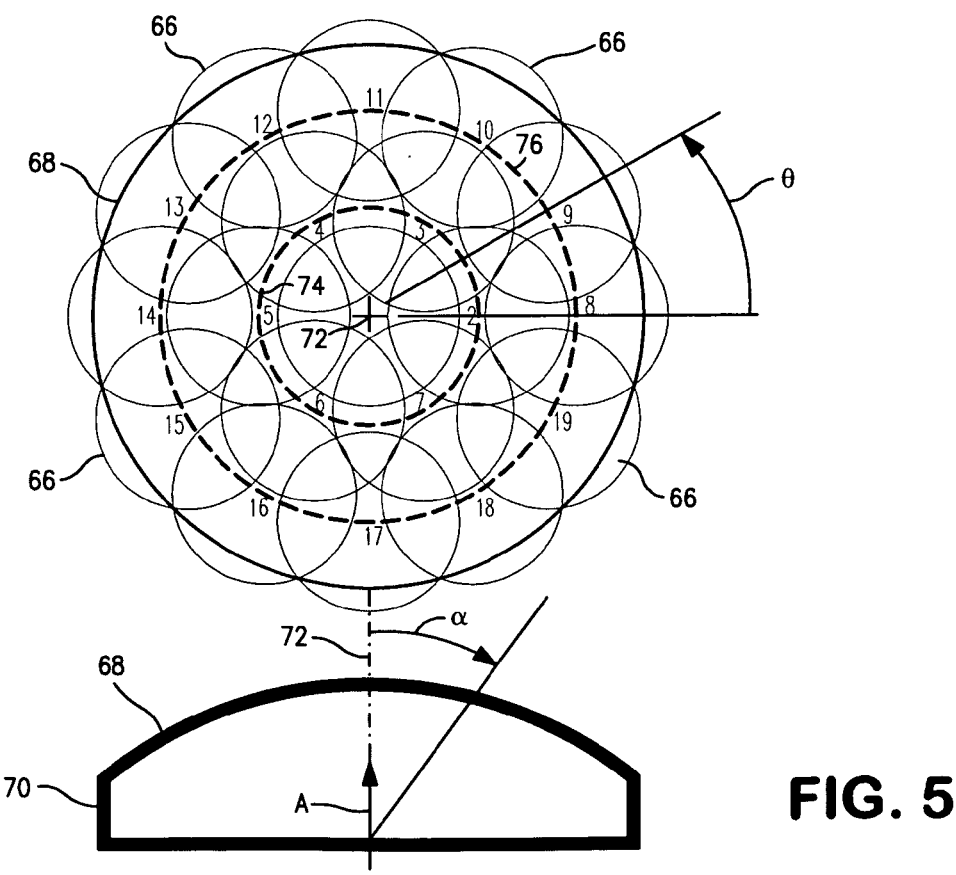
FIG. 5 is a diagram showing a lattice of partially overlapping subapertures covering the surface of a test object, which is also shown in profile for reference.

FIG. 5 depicts a lattice 64 of partially overlapping circular subaperture measurements 66 covering an aspheric surface 68 of a test object 70. Each of the subaperture measurements 66 is captured at a unique combination of aperture angle "$\alpha$" and azimuthal angle "$\theta$". The aperture angle "$\alpha$", which is shown referenced to the inclination of the external propagating axis 34 of the wavefront-measuring gauge 12 to the axis of symmetry 72 of the aspheric surface 68, generally corresponds to the rotational axis B. The azimuthal angle "$\theta$", which references an angular position about the axis of symmetry 72, generally corresponds to the rotational axis A through the chuck or stage 18 of the multi-axis machine 14. Other subaperture shapes and lattice configurations can be used for measuring similar or different test surfaces in accordance with the optics and other characteristics of the metrology system or preferences for processing data acquired by the metrology system.

Within the illustrated lattice 64, the subaperture measurements 66 are taken at just three different aperture angles "$\alpha$", where a first of the aperture angles "$\alpha$" is generally on axis, i.e., aligned with the axis of symmetry 72, and the second and third aperture angles "$\alpha$" are progressively inclined to the axis of symmetry 72. Just one subaperture measurement 66 is referenced at the first aperture angle "$\alpha$" (although multiple measurements could be taken particularly for calibration purposes), while several subaperture measurements 66 are referenced at each of the second and third aperture angles "$\alpha$" through different azimuthal angles "$\theta$". As such, the subaperture measurements 66 at the second and third aperture angles "$\alpha$" are arranged in concentric rings 74 and 76. Considering that the test object 70 is rotationally symmetric, the aspheric surface 68 is expected to be similarly shaped within the subaperture measurements 66 along each of the concentric rings 74 and 76.

The graphs of FIGS. 6a, 6b, and 6c plot in solid lines 68a, 68b, and 68c the expected (as unmodified by the variable optical aberrator) measurement wavefront profiles returning from the aspheric surface at the three aperture angles "$\alpha$", corresponding to the single on-axis subaperture 66 and two representative subapertures 66 taken along the rings 74 and 76. The horizontal axis (abscissa) demarked at "0" corresponds to the reference wavefront (e.g. as reflected from the spherical reference surface 29) or other datum against which the aspheric surface 68 is measured within the wavefront-measuring gauge 12. Brackets 78 (for illustrative purposes) represent the capture range of the wavefront-measuring gauge 12. (The actual capture range of an interferometer is generally a more complicated function.) Although the measurement wavefront profile 68a of the on-axis subaperture 66 is well within the capture range 78 of the wavefront-measuring gauge 12, the measurement wavefront profiles 68b and 68c of the subapertures located along the rings 74 and 78 extend well beyond the capture range 78 of the wavefront-measuring gauge 12.

FIGS. 7 and 8 schematically depict interventions of the variable optical aberrator 50 for reshaping the measurement wavefront 60 so that the returning measurement wavefront profiles from the subapertures located along the rings 74 and 76 are within, and preferably centered within, the capture range 78 of the wavefront-measuring gauge 12. The reshaped measurement wavefront profiles 80b and 80c, which are shown in dashed lines, represent the intended effect of the variable optical aberrator 50 on the original measurement wavefront profiles 68b and 68c within the constraints of the variable optical aberrator design. As depicted in FIGS. 7 and 8, the variable optical aberrator 50, which is shown in the form of a prism pair 90, is adjusted between the inclinations through second and third aperture angles "$\alpha$" for collecting the subaperture measurements 66 along the two radial rings 74 and 76. The adjustments include changes in both an overall wedge angle "$\omega$" of the prism pair 90 and an overall orientation angle "$\nu$" of the prism pair 90.

For purposes of reference, FIGS. 7 and 8 illustrate the axis of symmetry 72 of the rotationally symmetric test surface 68, the external propagating axis 34 of the wavefront-measuring gauge 12, along with an altered ray path 92 from the prism pair 90 to a center 94 of the subaperture 66 on the aspheric surface 68. The aperture angles "α" are preferably measured between the axis of symmetry 72 and the altered ray path 92, which extends to the center 94 of the subapertures 66. Similarly, the overall orientation angle "v" of the prism pair 90 is referenced between a back surface 96 of the prism pair 90 and a normal to the altered ray path 92. From FIG. 7 to FIG. 8, the settings of the prism pair 90 change as referenced by increases on both the overall wedge angle "ω" of the prism pair 90 and the overall orientation angle "v" of the prism pair 90 to provide a greater amount of wavefront compensation.

FIG. 9 depicts further details of a variable optical aberrator 100 including a pair of relatively angularly adjustable prisms 102 and 104 that are collectively adjustable about a rotational axis T and horizontal and vertical translational axes H and V with respect to the multi-axis machine 14. The prisms 102 and 104 are angularly adjustable about rotational axes S and W within respective rotational mountings 106 and 108 powered by actuators 110 and 112, such as servo-drives. Rotation of the prisms 102 and 104 about their rotational axes S and W provides for adjusting the overall wedge angle "ω" of the combined prisms.

A flange 114 supporting the rotational prism mountings 106 and 108 is rotationally mounted to a carrier 116 of a horizontal motion stage 118 for rotation about the rotational axis T, generally for adjusting the collective orientation of the prisms 102 and 104 with respect to both the optical axis 34 of the wavefront-measuring gauge 12 and the axis of symmetry 72 of the test object through the orientation angle "v". The horizontal stage 118 also functions as a carrier for the vertical stage 120. Together, the horizontal and vertical stages 118 and 120, which can also be controlled by manual or automatic actuators (not shown), provide for collectively translating the prisms 102 and 104 along the translational axes H and V for positioning the prisms 102 and 104 with respect to both the wavefront-measuring gauge 12 and the test object 70 (e.g., preferably centered with respect to the optical axis 34 of the wavefront-measuring gauge 12). Measurement gauges, such as encoders, (not shown) can be associated with all three rotational axes S, W, and T and both translational axes H and V both as feedback to the actuators and as indicators of the expected performance of the variable optical aberrator 100. Different numbers, orientations, and stacking relationships are also possible for both reconfiguring the variable optical aberrator and relatively adjusting the variable optical aberrator with respect to the multi-axis machine 14.

Although the effect of adjustments of the variable optical aberrator 100 on the measurement wavefront 60 can be estimated to a certain accuracy, such as by carefully calibrating the variable optical aberrator 100 and by carefully measuring the adjustments to the variable optical aberrator 100, some amount of residual error remains that can significantly affect the accuracy with which the aspheric test surface 68 can be measured. With reference to the graphs of FIGS. 6b and 6c, the dashed lines 80b and 80c represent the estimated and expected effect of the given settings of the variable optical aberrator 100 on the resulting measurement wavefront for measuring an ideal aspheric test object. However, the actual performance of the variable optical aberrator 100 differs from its estimated effect as represented by the dotted wavefront forms 82b and 82c. The difference can significantly bias the measurement of the test object.

However, in accordance with a preferred embodiment of this invention, further processing of the overlapping subaperture measurements 66 can compensate for residual errors accompanying use of the variable optical aberrator 100. The partially overlapping subaperture measurements 66 can be recorded as data maps containing measures of wavefront variations associated with different locations on the test object. The wavefront differences measured against a datum such as a reference sphere represent differences of the test object from the datum as diminished by the effects of the variable optical aberrator 100. Alternatively, the datum against which the wavefront differences are measured is a combination of the original datum of the wavefront-measuring gauge (e.g., the spherical reference surface) and the variable optical aberrator 100. Either way, assumptions regarding the contribution of the variable optical aberrator 100 directly affect the interpretation of the wavefront differences measured by the wavefront-measuring gauge 12.

In addition, typical data maps equate the wavefront measures of the test object to corresponding points on the test surface. For accommodating expected distortions, the overlapping data maps can be projected onto a global coordinate system (e.g., the equatorial plane of the test object) with a nominal distortion map. If the coordinates on the global plane are written as (X,Y) or more simply as X, the grid points, after being ordered conveniently, can be written as $X_l$ for l=1, 2, . . . L. Their density can be chosen so that the associated points on each sub-aperture data set roughly match its resolution; it is not useful to choose their density to be larger than this, but it may be convenient to make it smaller. By interpolating to find the values of the j'th sub-aperture data set at the grid points on the global plane, the values for a function $f_j(X)$ are found. Similarly, scaled conventional compensators for this data can be used to generate a function $g_{jk}(X)$ for k=1, 2, . . . K where K is the number of these compensators in use (typically seven: four basic compensators plus the three for data repositioning). In addition, scaled interlocked compensators become can be represented as $G_{j\gamma}(X)$ for γ=1, 2, . . . Γ, where Γ is the number of compensators used to correct for errors such as distortion and reference wavefront errors.

The compensated data sets can now be written as $$F_j(X) = f_j(X) + \sum_k a_{jk} g_{jk}(X) + \sum_\gamma \alpha_\gamma G_{j\gamma}(X) \qquad (2)$$

where $\alpha_{jk}$ and $\alpha_\gamma$ are the stitching coefficients. The scaling discussed above means that the sum of the square of these coefficients is required to be less than unity. In the above equation, interlocking means that the coefficients on $G_{j\gamma}(X)$ have the same value for all the sub-apertures, i.e., these coefficients $\alpha_\gamma$ are independent of j. The basic task of the stitching is to find the values for these coefficients that fall within the unit sphere and minimize the mean square difference between any overlapping values. Additional details and examples regarding the use of both free and interlocked compensators in stitching operations is disclosed in co-assigned U.S. Pat. No. 6,956,657 entitled "Method for Self-Calibrated Sub-Aperture Stitching for Surface Figure Measurement," which is hereby incorporated by reference.

Globally interlocked compensators chiefly account for systematic corruption common to all subaperture data sets. Partially interlocked compensators can take various forms and address a number of factors, but not all of the data sets need be impacted by these factors. In the case of a rotationally symmetric test object, for example, the data sets may comprise a collection of subapertures arranged in the rings 74 and 76 about the axis of symmetry 72. The different subapertures on any particular ring 74 or 76 can be chosen to be nominally equivalent, and except for rotation about the A axis, the metrology system can therefore be configured in substantially the same way for all of them. In such a case, compensation may be required in each such rings to account for such influences as the impact of gravity on the opto-mechanical system or some other set of particular misconfigurations within the metrology system. The associated partially interlocked compensators would thus have an impact only on those data sets measured around a particular ring 74 or 76. In addition, the data sets can be split into other classes than just these rings, and the interlocked compensators would act only within the particular subsets of the subapertures corresponding to these classes. For example, some subapertures could be taken without the aberrator at all, or both with and without the aberrator at the same subaperture position. Systematic errors of the aberrator would not be included as compensators for subapertures that do not use the aberrator.

Partially interlocked compensators can also be represented within Equation (2). To do so, any value of $\gamma$ that is associated with a partially interlocked compensator on a particular subset, $G_{j\gamma}(X)$ is then taken to be identically zero for values of j that correspond to subapertures that are not in that subset. Such a process can be implemented by determining the subset of j values that are active for each interlocked compensator, i.e. for each value of $\gamma$. The result can be denoted by, say $\delta_{j\gamma}$, which vanishes unless j is in the subset associated with $\gamma$; it is equal to unity otherwise. By introducing such a factor explicitly into Equation (2), $G_{j\gamma}(X)$ need no longer be concerned with such grouping but can focus purely on a particular perturbation of the system. That is, Equation (2) can be re-written as $$F_j(X) = f_j(X) + \sum_k a_{jk} g_{jk}(X) + \sum_\gamma \alpha_\gamma \delta_{j\gamma} G_{j\gamma}(X) \quad (3)$$

For any value of $\gamma$ that is associated with a globally interlocked compensator, $\delta_{j\gamma}$ is simply unity for all j. Partially interlocked compensators on the other hand are associated with values of $\gamma$ for which $\delta_{j\gamma}$ is zero for some values of j. It is possible to conceive of cases where the interlocking involves not just a binary switch, but some other interdependence between j and $\gamma$. For example, there may be a system perturbation that grows in a particular fashion between one subset and another. Such a thing can be accounted for by allowing $\delta_{j\gamma}$ to have a more general dependence on j and $\gamma$. While all such cases can be described exactly by Equation (2) as it stands, it can be helpful at times to make the various flavors of interlocking more explicit as evident in the equivalent form given in Equation (3). Since some aspects of the compensators are now handled by the factor $\delta_{j\gamma}$, such modifications only serve to simplify the interpretation of $G_{j\gamma}(X)$.

The compensated data sets, as represented in the global coordinate system, comprise a composite data map formed by stitching the subaperture measurements together while minimizing differences between the overlapping portions of the original data maps. The compensators incorporated into the stitching operation also minimize the effects of systematic errors that could otherwise corrupt the measurements. By specifically incorporating compensators that represent systematic errors attributable to the variable optical aberrator 100, any differences between the estimated effect of the variable optical aberrator 100 on the subaperture measurements and the actual effect of the variable optical aberrator 100 can be minimized in the compensated data sets.

Preferably, the wavefront effects of the variable optical aberrator 100 at its various settings are estimated as closely as possible, at least so that the wavefront corrections imposed by the variable optical aberrator 100 reshape the measurement wavefronts 68b and 68c to within the capture range 78 of the wavefront-measuring gauge 12 and preferably centered within the capture range 78. In addition, the values acquired by the related compensators from a series of measurements can be used to modify the assumptions used for estimating the wavefront effects of the variable optical aberrator 100. For example, the value of certain corresponding interlocked compensators could be used to adjust assumptions regarding the refractive index or physical dimensions of the prisms 102 and 104. The values of the partially interlocked compensators could be used to correct assumptions regarding the different settings of the variable optical aberrator between measurements taken at different aperture angles "$\alpha$".

Each potential error in a sub-aperture measurement attributable to the variable optical aberrator can be assigned a compensator. These include the design specifications for the wedges (typically as interlocked compensators) and repositioning parameters between settings (typically as partially interlocked compensators). More specifically, the compensators can be arranged to represent (a) optical errors such as figure error on the prisms, prism angle error, refractive index, and thickness, (b) opto-mechanical errors such as prism misalignment within its mount, and (c) mechanical alignment errors such as relative misalignment of the axes of motion. Each such compensator includes a variable amplitude corresponding to the coefficients referred to above and a functional form that relates a change in the amplitude to the expected effect on the measurement wavefront shape. For example, FIGS. 10a and 10b show the expected effect on the measurement wavefronts 122 and 124 of a small tilt error of the prisms about the T rotational axis at two different aperture angles "$\alpha$". As depicted, the same amplitude of the tilt error is expressed differently within the two apertures corresponding to different settings of the variable optical aberrator.

The desired wavefront effect of the variable optical aberrator preferably provides for matching the measurement wavefront to the datum using components that correct for such aberrations as astigmatism, coma, and trefoil. A two-dimensional series expansion of a general wavefront about a point to the third order is given below:

Wavefront$(x,y)=A_{00}+A_{10}x+A_{01}y+\{DC$ and $1^{st}$ order$\}A_{20}x^2+A_{11}xy+A_{02}y^2+\{$second order$\}A_{30}x^3+A_{21}x^2y+A_{12}xy^2+A_{03}y^3+\{$third order$\}$ (4)

where $A_{mn}$ are the polynomial expansion coefficients of order "m" in x and order "n" in y (the total order being the sum of m and n). Note that these coefficients would vary not only by the wavefront of interest (generated, for example, by reflecting a wavefront off of an aspheric test object), but also by subaperture position on the same wavefront, so a near-null system would benefit from being able to freely adjust its parameters to compensate these coefficients as well as possible. The DC and first order terms can be eliminated by proper alignment of the metrology system (i.e., these terms indicate a DC shift, x tilt, and y tilt), so the near-null system is not responsible for compensating these terms. At the second order, there are three terms, but one of these terms can be eliminated by using an adjustable spherical wavefront (see, for example, FIG. 3). This leaves two terms (i.e., two degrees of freedom) at the second order and four terms (i.e., four degrees of freedom) at third the order.

An assumption of mirror symmetry of the test object (as is the case for rotationally symmetric aspheres, the most common class of aspheres) can further simplify the expansion (and thus what is useful for a near-null system to compensate). As a result, only a nominal wavefront, symmetric (or even) in x, remains as a target for compensation. In particular any x-odd term need not be targeted for compensation if the nominal wavefront of interest is rotationally symmetric (which is commonplace among aspheric optical surfaces and optical systems). Accordingly, the $A_{11}$ xy, $A_{30}$ $x^3$ and $A_{12}$ $xy^2$ terms can be eliminated, leaving just one second order degree of freedom ($x^2-y^2$) and two third order degrees of freedom (for a total of three remaining terms for a series approximation to third order). Since most optical systems of wavefront-measuring gauges have circular apertures, the three remaining degrees of freedom can be conveniently expressed in terms of Zernike polynomials, as shown below:

$$Z5(x,y)=(x^2-y^2),$$

$$Z8(x,y)=(3(x^2+y^2)-2)y,$$

$$Z11(x,y)=(3x^2-y^2)y \quad (5)$$

While aspheric test objects can vary widely in different ways, if the variable optical aberrator due to a lack of degrees of freedom, can address only one of the two third-order terms, capacity to compensate Z8 over Z11 is generally preferred. The Zernike terms Z5 and Z8 correspond generally to individual examples of astigmatism and coma, which are among the preferred types of wavefront corrections for off-axis subaperture measurements.

The preferred variable optical aberrator 100 features a Risley prism pair with relative rotational and positional controls for effecting the desired wavefront corrections. The design is preferred because of its simple structure that is easily manufactured and modeled for producing predictable wavefront effects that are particularly suited to off-axis subaperture measurements of rotationally symmetric aspheric test objects. However, the variable optical aberrator can take a variety of other forms that may be more suited for measuring other aspheric test objects or for more making higher order corrections. For example, the variable optical aberrator can include combinations of plates and counter-rotating cylinders, combinations of counter translating piano lenses and counter-rotating cylinders, and pairs of tilted reflecting spheres. Other adjustable wavefront aberrating devices that can be used as variable optical aberrators for at least some of the purposes of this invention include deformable mirrors, spatial light modulators, and Alvarez lens pairs. The choice of variable optical aberrator can be linked to the types of aberration required for near nulling the measurement wavefront. For measuring rotationally symmetric aspheres, various combinations of combinations of components for representing aberrations such as astigmatism, coma, and trefoil are preferred.

Although the variable optical aberrator 50, 100 is shown located within the measurement cavity of a Fizeau interferometer, the variable optical aberrator could be used in other types of interferometers, such as a shearing or Twyman-Green interferometer, as well as elsewhere within the interferometer. For example, the variable optical aberrator could be located in the reference arm of the Twyman-Green interferometer. While the test objects, e.g., 42, 52, and 70 are all shown measured under conditions of reflection, these or other test objects could also be measured under conditions of transmission, including conditions where multiple surfaces of one or more test objects or refractive index variations within test objects contribute to the formation of a measurable aspheric wavefronts. For example, aspheric wavefronts measurable in accordance with the invention can be generated by spherical and piano elements in transmission.

The wavefront-measuring device can also take the form of a Shack-Hartman wavefront sensor system as shown in FIGS. 11*a* and 11*b* in which similar intermediate optics shape a measurement wavefront for reflection from a test object surface. Many of the same optics as described for use with the Fizeau interferometer of FIG. 3 can be used in the Shack-Hartman wavefront sensor system and the similar optics share the same reference characters. Two main differences are apparent. The (CCD) detector 12*g* and associated electronics 12*h* are replaced by a Shack-Hartman package 12HS, the overall components of which are shown in the enlargement of FIG. 11*b*. In the Shack-Hartman package 12HS, a lenslet array HS1 is located in advance of a detector HS3, which can also be a CCD detector, so focal spots HS2 of the lenslet array HS1 appear on the detector HS3. The Shack-Hartman package 12HS can be arranged to measure local variations in wavefront slope, which can be combined into a fuller description of the measurement wavefront. Also in contrast with the Fizeau interferometer, the transmission sphere 28 is replaced by a converging lens 28HS that converts the collimated beam 30 into a converging beam with a spherical measurement wavefront but without retroreflecting a portion of the beam as a reference wavefront. The calibrated detector HS3 of the Shack-Hartman package provides a datum (e.g., a reference plane) against which changes in the measurement wavefront are measured.

While the invention has been described with respect to a limited number of embodiments, the invention can be expressed in numerous other embodiments and various modifications can be made, which will be apparent to those of skill in the art within the overall teaching of this invention.

The invention claimed is:

1. A method of expanding the operating range of a metrology system for measuring aspheric test objects comprising steps of:
    associating an optical wavefront propagator with a physical test object in a plurality of different relationships for conveying optical measurement wavefronts to the test object;
    acquiring partially overlapping optical wavefront measurements of the test object in each of the different relationships by measuring shapes of the measurement wavefronts with an optical wavefront-measuring gauge having a limited capture range of wavefront shapes;
    reshaping the measurement wavefront into an aspheric form with a variable optical aberrator between a limited number of the measurements in the different relationships to maintain the measurement wavefront within the capture range of the wavefront-measuring gauge;
    incorporating compensators in an operation for assembling the partially overlapping measurements into a composite measurement, and
    acquiring values for the compensators in the operation for reducing differences between overlapping portions of the measurements that are at least partially attributable to the reshaping of the measurement wavefront by the variable optical aberrator.

2. The method of claim 1 wherein
    (a) the variable optical aberrator is adjustable through a range of settings for reshaping the measurement wavefront,
    (b) the compensators have both an amplitude and a functional form that defines a change in the shape of the measurement wavefront that is scalable by the amplitude, and
    (c) the compensators include partially interlocked compensators, and
    (d) the step of acquiring values for the compensators includes acquiring values for the partially interlocked compensators having a substantially common amplitude over a set of measurements taken at the same setting of the variable optical aberrator.

3. The method of claim 2 wherein the step of acquiring values for the compensators includes acquiring values for the partially interlocked compensators having a different substantially common amplitude over a different set of the measurements taken at a different setting of the variable optical aberrator.

4. The method of claim 3 including a step of using the partially interlocked compensators to define differences between an estimated change in the shape of the measurement wavefront produced at a particular setting of the variable optical aberrator and an actual change in the shape of the measurement wavefront produced at the particular setting of the variable optical aberrator.

5. The method of claim 4 including a step of basing the estimated change in the shape of the measurement wavefront produced at each setting of the variable optical aberrator on a model of the variable optical aberrator.

6. The method of claim 5 including a step of relating a variable within the model of the variable optical aberrator to a change in the shape of the measurement wavefront that is scalable by the amplitude.

7. The method of claim 6 including steps of reconfiguring the variable optical aberrator between settings and acquiring values for the at least one partially interlocked compensator based on the reconfiguration of the variable optical aberrator.

8. The method of claim 1 wherein
the wavefront-measuring gauge includes an interferometer,
the measurement wavefront includes a test wavefront and a reference wavefront,
the step of acquiring partially overlapping wavefront measurements of the test object includes propagating the test wavefront into an encounter with the test object and comparing a change in shape of the test wavefront as effected by the encounter with the test object against the reference wavefront, and
the step of reshaping the measurement wavefront into the aspheric form with the variable optical aberrator includes changing the shape of at least one of the test wavefront and the reference wavefront to reduce differences between the test and reference wavefronts.

9. The method of claim 1 wherein the wavefront-measuring gauge includes
a wavefront sensor for measuring a limited range of wavefront shapes within the capture range of the wavefront-measuring gauge, and
a wavefront generator that generates the measurement wavefront in a shape that is within the limited range of wavefront shapes measurable by the wavefront sensor.

10. The method of claim 9 wherein
the step of acquiring partially overlapping wavefront measurements of the test object includes propagating the measurement wavefront into an encounter with the test object for changing the shape of the measurement wavefront in accordance with a physical characteristic of the test object and
the step of reshaping the measurement wavefront with the variable optical aberrator includes changing the shape of the measurement wavefront so that a combined effect of the changes in shape of the measurement wavefront effected by the encounter with the test object and the reshaping of the measurement wavefront maintains the shape of the measurement wavefront within the limited range of wavefront shapes measurable by the wavefront sensor.

11. The method of claim 1 wherein the step of reshaping the measurement wavefront into the aspheric form with a variable optical aberrator includes evaluating whether the measurement wavefront is within the capture range of the wavefront-measuring gauge and further reshaping the measurement wavefront to restore the measurement wavefront within the capture range of the wavefront-measuring gauge.

12. The method of claim 1 wherein the step of associating a wavefront propagator with a physical test object in a plurality of different relationships includes relatively moving an axis of the wavefront propagator with respect to an axis of the physical test object through a plurality of off-axis positions.

13. The method of claim 12 wherein the step of reshaping the measurement wavefront with the variable optical aberrator includes changing the measurement wavefront to include at least one of astigmatism, coma, and trefoil.

14. A method of assembling a composite measurement of a physical test object from a plurality of partially overlapping measurements of the test object comprising steps of:
acquiring a plurality of partially overlapping data maps measuring a physical property of the test object from a test wavefront that encounters the test object, each data map being extracted from a shape of the test wavefront referenced against a datum;
relatively changing the shape of the test wavefront into an aspheric form with respect to the datum independently of the test object between acquisitions of a limited number of the data maps to reduce differences between the shape of the test wavefront and the datum, including relatively changing the shape of the measurement wavefront to include at least one of astigmatism, coma, and trefoil;
evaluating overlapping regions of the data maps to characterize the relative change in the wavefront shape between acquisitions of the data maps; and
modifying the data maps in accordance with the characterization of the relative change in the wavefront shape between measurements for assembling the partially overlapping data maps into a composite data map.

15. The method of claim 14 including a step of assembling the partially overlapping data maps into the composite data map and displaying the composite data map as an external representation of the test object.

16. The method of claim 14 including a step of estimating changes in the shape of the test wavefront effected by the encounters of the test wavefront with the test object and the step of relatively changing the shape of the test wavefront into the aspheric form with respect to the datum includes counteracting at least part of the estimated changes in the shape of the test wavefront to reduce the differences between the shape of the test wavefront and the datum.

17. The method of claim 16 including a step of estimating the change in the relative shape of the test wavefront with respect to the datum effected by the step of relatively changing the shape of the test wavefront into the aspheric form with respect to the datum, and the step of evaluating overlapping regions of the data maps includes distinguishing between the estimated change in the relative shape of the test wavefront with respect to the datum and an actual change in the relative shape of the test wavefront with respect to the datum for characterizing a systematic error in the data maps.

18. The method of claim 17 including a step of assembling the partially overlapping data maps into the composite data map while suppressing influence of the systematic error in the data maps associated with the relative change in the shape of the test wavefront with respect to the datum on the composite data map.

19. The method of claim 18 wherein the step of evaluating includes defining compensators to account at least in part for differences between the estimated change in the relative shape of the test wavefront with respect to the datum and the actual change in the relative shape of the test wavefront with respect to the datum.

20. The method of claim 19 wherein the compensators include partially interlocked compensators and including steps of maintaining the shape of the test wavefront with respect to the datum between acquisitions of a limited number of the data maps, and constraining the partially interlocked compensators to acquire a substantially common value over a set of the data maps acquired while maintaining the shape of the test wavefront with respect to the datum.

21. The method of claim 14 wherein the compensators include partially interlocked compensators and the step of evaluating includes defining the partially interlocked compensators to account at least in part for the relative change in the shape of the test wavefront with respect to the datum, and constraining the partially interlocked compensators to acquire a substantially common value for a given relative change in the shape of the test wavefront with respect to the datum.

22. The method of claim 21 including steps of
incorporating compensators in an operation for assembling the partially overlapping data maps into a composite data map,
assembling the partially overlapping data maps into the composite data map, and
displaying the composite data map as an external representation of the test object.

23. A method of assembling a composite measurement of a physical test object from a plurality of subaperture measurements of the test object comprising steps of:
generating an optical measurement wavefront,
propagating the measurement wavefront through encounters with both a variable optical aberrator and the physical test object en route to a wavefront-measuring gauge having a limited capture range of wavefront shapes;
stepping an axis of an optical wavefront propagator relative to an axis of the physical test object through a succession of off-axis positions between the wavefront propagator and the test object, the wavefront propagator being arranged for conveying the measurement wavefront to the test object;
adjusting the variable optical aberrator between a limited number of the off-axis positions for maintaining the shape of the measurement wavefront within the capture range of the wavefront-measuring gauge;
collecting partially overlapping subaperture measurements of the test object with the wavefront-measuring gauge at the succession of off-axis positions;
modeling effects of the variable optical aberrator on the subaperture measurements;
evaluating mismatched measurements within overlapping portions of subaperture measurements to further characterize effects of the variable optical aberrator on the subaperture measurements, including changing values of variables within the model to reduce the mismatched measurements within overlapping portions of subaperture measurements; and
stitching the subaperture measurements of the test object together into a composite measurement while discounting the characterized effects of the variable optical aberrator on the subaperture measurements.

24. The method of claim 23 in which the step of stepping includes relatively rotating the axis of the wavefront propagator about the axis of the test object for collecting a set of radial subaperture measurements of the test object, and including a step of maintaining the variable optical aberrator at a fixed setting between the common radial subaperture measurements.

25. The method of claim 24 in which the step of evaluating includes constraining at least some of the variables within the model to include substantially common values for each of the common radial subaperture measurements.

26. The method of claim 23 in which the steps of evaluating and stitching include incorporating compensators in an operation for assembling the partially overlapping subaperture measurements into the composite measurement, and including a step of acquiring values in the operation for reducing differences between the overlapping portions of the subaperture measurements that are at least partially attributable to the variable optical aberrator.

27. The method of claim 26 wherein
(a) the variable optical aberrator is adjustable through a range of settings for reshaping the measurement wavefront,
(b) the compensators have both an amplitude and a functional form that defines a change in the shape of the measurement wavefront that is scalable by the amplitude,
(c) the compensators include partially interlocked compensators, and
(d) the step of acquiring values in the operation includes acquiring values for the partially interlocked compensators having a substantially common amplitude over a set of measurements taken at the same setting of the variable optical aberrator.

28. The method of claim 27 wherein the step of acquiring values in the operation includes acquiring values for the partially interlocked compensators having a different substantially common amplitude over a different set of the measurements taken at a different setting of the variable optical aberrator.

29. The method of claim 23 wherein
the wavefront-measuring gauge includes an interferometer,
the measurement wavefront includes a test wavefront and a reference wavefront,
the step of collecting partially overlapping subaperture measurements of the test object includes propagating the test wavefront into an encounter with the test object and comparing a change in shape of the test wavefront as effected by the encounter with the test object against the reference wavefront, and
the step of adjusting the variable optical aberrator includes changing the shape of at least one of the test wavefront and the reference wavefront to reduce differences between the test and reference wavefronts.

30. The method of claim 23 wherein the wavefront-measuring gauge includes
a wavefront sensor for measuring a limited range of wavefront shapes within the capture range of the wavefront-measuring gauge, and
a wavefront generator that generates the measurement wavefront in a shape that is within the limited range of wavefront shapes measurable by the wavefront sensor.

* * * * *